United States Patent
Bose et al.

(10) Patent No.: US 7,921,331 B2
(45) Date of Patent: *Apr. 5, 2011

(54) WRITE FILTER CACHE METHOD AND APPARATUS FOR PROTECTING THE MICROPROCESSOR CORE FROM SOFT ERRORS

(75) Inventors: Pradip Bose, Yorktown Heights, NY (US); Zhigang Hu, Ossining, NY (US); Xiaodong Li, Longmont, CO (US); Jude A. Rivers, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 217 days.

This patent is subject to a terminal disclaimer.

(21) Appl. No.: 12/138,099

(22) Filed: Jun. 12, 2008

(65) Prior Publication Data

US 2008/0244186 A1  Oct. 2, 2008

Related U.S. Application Data

(63) Continuation of application No. 11/487,196, filed on Jul. 14, 2006, now Pat. No. 7,444,544.

(51) Int. Cl.
G06F 11/00 (2006.01)
G06F 11/08 (2006.01)
(52) U.S. Cl. ............. 714/21; 714/15; 714/49; 714/822
(58) Field of Classification Search ............. 714/15, 714/21, 38, 49, 54, 819, 822
See application file for complete search history.

(56) References Cited

U.S. PATENT DOCUMENTS

| | | | |
|---|---|---|---|
| 4,456,952 A | 6/1984 | Mohrman et al. | |
| 5,276,848 A * | 1/1994 | Gallagher et al. | 711/121 |
| 5,890,003 A | 3/1999 | Cutts et al. | |
| 6,412,094 B1 * | 6/2002 | Van Holten et al. | 714/822 |
| 6,530,003 B2 * | 3/2003 | Bakke et al. | 711/162 |
| 6,625,749 B1 | 9/2003 | Quach | |
| 6,751,749 B2 | 6/2004 | Hofstee et al. | |
| 6,792,525 B2 | 9/2004 | Mukherjee et al. | |
| 6,810,489 B1 * | 10/2004 | Zhang et al. | 714/6 |
| 6,854,051 B2 * | 2/2005 | Mukherjee | 712/248 |
| 7,017,073 B2 * | 3/2006 | Nair et al. | 714/11 |
| 7,146,530 B2 | 12/2006 | Pomaranski et al. | |
| 7,206,964 B2 * | 4/2007 | Moser et al. | 714/13 |

(Continued)

OTHER PUBLICATIONS

Gopal et al., "Speculative Versioning Cache", University of Wisconsin-Madison, USA. Jul. 14, 1997.

(Continued)

*Primary Examiner* — Scott T Baderman
*Assistant Examiner* — Joseph Schell
(74) *Attorney, Agent, or Firm* — Scully, Scott, Murphy & Presser, P.C.; Louis J. Percello, Esq.

(57) ABSTRACT

A write filter cache system for protecting a microprocessor core from soft errors and method thereof are provided. In one aspect, data coming from a processor core to be written in primary cache memory, for instance, L1 cache memory system, is buffered in a write filter cache placed between the primary cache memory and the processor core. The data from the write filter is move to the main cache memory only if it is verified that main thread's data is soft error free, for instance, by comparing the main thread's data with that of its redundant thread. The main cache memory only keeps clean data associated with accepted checkpoints.

17 Claims, 7 Drawing Sheets

U.S. PATENT DOCUMENTS

| | | | |
|---|---|---|---|
| 7,321,989 B2 | 1/2008 | Grayver | |
| 7,350,026 B2 * | 3/2008 | Popescu et al. | 711/119 |
| 7,353,365 B2 * | 4/2008 | Mukherjee et al. | 712/218 |
| 7,360,118 B1 * | 4/2008 | Fesler | 714/36 |
| 7,373,548 B2 * | 5/2008 | Reinhardt et al. | 714/13 |
| 2005/0154944 A1 | 7/2005 | Reinhardt et al. | |
| 2006/0136672 A1 * | 6/2006 | Chaudhry et al. | 711/122 |

OTHER PUBLICATIONS

T.N. Vijaykumar et al., "Transient-Fault Recovery Using Simultaneous Multithreading", School of Electrical and Computer Engineering, Purdue University, W. Lafayette, IN 47907, Published 2002.

Gomaa et al. "Transient-fault Recovery for Chip Multiprocessors", School of Electrical and Computer Engineering, Purdue University, Published 2003.

Qureshi et al. "Microarchitecture-Based Introspection: A Technique for Transient-Fault Tolerance in Microprocessors", Department of Electrical and Computer Engineering, The University of Texas at Austin, Published 2005.

Reinhardt et al. "Transient Fault Detection via Simultaneous Multithreading", Proceedings of the 27th Annual International Symposium on Computer Architecture (ISCA), Jun. 2000.

Rotenberg "AR-SMT: A Microarchitectural Approach to Fault Tolerance in Microprocessors", Computer Sciences Department, Published 1999.

* cited by examiner

WRITE FILTER CACHE METHOD AND APPARATUS FOR PROTECTING THE MICROPROCESSOR CORE FROM SOFT ERRORS

RELATED APPLICATIONS

This application is a continuation of U.S. Ser. No. 11/487,196, filed Jul. 14, 2006, the entire contents of which are incorporated herein by reference.

FIELD OF THE INVENTION

The present disclosure generally relates to computer processing and particularly to detecting and correcting soft errors in microprocessors.

BACKGROUND OF THE INVENTION

Use of data processing systems has grown exponentially in recent years with the increased use of computing devices. Users have come to rely on data processing systems in every aspect of business and society. With this reliance therefore, preventing soft errors has become increasingly important to a system's overall performance.

As technology feature sizes continue to shrink due to semiconductor advancements, opportunities exist for microprocessor design, for example, at continuing performance improvement. At the same time however, as devices get smaller and smaller, there is an emerging real concern for future generation computing systems' susceptibility to soft and transient errors. Soft and transient errors are generally caused by effects of alpha particles and cosmic rays, as well as to some extent, power and voltage glitches. Alpha particles or neutrons (as in cosmic rays) hitting transistors generate electron-hole pairs, which the devices may collect. Soft errors happen when the amount of charge collected by a device exceeds the device's critical charge, often referred to as Qcrit, required to upset the device from its normal operation. Soft errors appear as current pulses in transistors. They may cause errors in combinational logic or cause bit flips in random access memory (RAM) cells. Historically, soft errors were only of great concern to outer space applications where cosmic rays are strong and random access memory were designed with very small Qcrit. However, technology projections indicate that the average Qcrit per transistor will reduce by a factor of two for each new generation of technology as transistors get smaller and smaller. Hence, it is expected that failures in time (FIT) for the typical microprocessor will increase very quickly as the future technology advances to device miniaturization. Even if the average Qcrit per transistor for the storage and logic cell were to remain the same, it is clear that with increasing miniaturization, more and more transistors will fit into the space that had hitherto been occupied by one or two transistors. Hence, the incidence of soft failures per a fixed circuit area is bound to increase.

To ensure and protect computer systems against soft errors in general, many fault tolerance approaches have been used traditionally to detect and possibly correct errors. These approaches basically comprise of information redundancy and execution redundancy. Data storage structures (e.g. SRAMS, register arrays, and queues) within a microprocessor chip, due to their regular patterns, tend to be protected by well-known information redundancy techniques like parity protection and error correcting codes (ECC). Combinational logic structures (e.g. ALUs, FXUs, and FPUs), within a processor chip, on the other hand, have irregular patterns, which make it necessary to protect through execution redundancy. Execution redundancy can be further distinguished between time and space. Space redundancy is achieved through executing a task or instruction on multiple disjoint hardware structures, and comparing the results for accuracy. Space redundancy generally has low performance overhead but necessitates hardware in proportion to the number of disjoint computations. Time redundancy is achieved through executing a task or instruction on the same hardware multiple times, and comparing the results for accuracy. Time redundancy generally has low hardware requirements overhead but results in high performance overhead, but given the trends of leakage power adverse effects on a microprocessor chip's general health, the time redundancy concept remains a good option for protecting a system against errors.

It is therefore not surprising why there have been many recent time redundancy-based approaches for microprocessor error detection and correction, for example, in some form utilizing the general concept of redundant multithreading. Generally, redundant threading provides fault tolerance in a microprocessor by executing the given task or application using two separate threads in simultaneous multithreading (SMT), concurrent redundant threading (CRT), or chip multithreading (CMP) environments, comparing between the two (leading/master and trailing/slave) threads at some specified point in the pipeline, and where there are disagreements, flushing the microprocessor pipeline and rolling back to a previously verified and saved checkpoint to re-start the computation. These various redundant threading mechanisms target idle processing bandwidth either at a fine-grain level as a result of unused processing slots due to limited instruction level parallelism (ILP) in each cycle or at a coarse grain level due to long-latency events like level two cache misses. As expected, hardware implementation for these methods typically result in a high area overhead (estimated to be about 35%) on chip and could result in a performance overhead of about 40% as well.

These redundant threading soft error protection solutions all require the processor's ability to rollback to a previous checkpoint and redo some computations when a miss-comparison occurs. See, E. Rotenberg, "AR-SMT: A Microarchitectural Approach to Fault Tolerance in Microprocessors", Proceedings of the $29^{th}$ Annual International Symposium on Fault-Tolerant Computing, June 1999; S. K. Reinhardt and S. S. Mukherjee, "Transient Fault Detection via Simultaneous Multithreading", Proceedings of the 27th Annual International Symposium on Computer Architecture, June 2000; M. Gomaa, C. Scarbrough, T. N. Vijaykumar, and I. Pomeranz, "Transient-Fault Recovery for Chip Multiprocessors", Proceedings of the 30th Annual International Symposium on Computer Architecture, June 2003; T. N. Vijaykumar, I. Pomeranz, and K. Cheng, "Transient-Fault Recovery via Simultaneous Multithreading", Proceedings of the 29th Annual International Symposium on Computer Architecture, May 2002.

All these widely discussed techniques tend to limit the error checking to be inside the processor core since their recovery abilities for a normal processor is often confined to the instruction window. In order to recover beyond the instruction window therefore, a form of cache state buffering is necessary. However, if every store or load from a leading thread has to be compared against its corresponding equivalent or counterpart from the trailing thread in a redundant threading execution before it is committed to cache memory, the two threads would have to be very highly synchronized at all times during execution, thus causing a high performance overhead and undue contention on microprocessor resources.

Given that these soft errors do not happen very frequently, it would be useful to execute the program at full speed for a certain amount of instructions before stopping for a soft error check. Error checking can be done by comparing the architecture states of two threads or two cores (including the cache state). Once an error is detected, the ability to rollback to the previous checkpoint is needed which may be thousands of instructions earlier and that requires the buffering of all the intermediate state data.

The current first level (L1) cache structure and organization in a microprocessor is not conducive for the courser grain redundant threading that we describe in the last paragraph since intermediate data must be buffered to avoid corrupting or destroying a saved checkpoint state, and if there is a need for a roll-back and re-compute, the intermediate data must be squashed efficiently. T. N. Vijaykumar, S. Gopal, J. E. Smith, and G. Sohi, "Speculative Versioning Cache", Proceedings of the Fourth International Symposium on High-Performance Computer Architecture, February 1998, proposes a speculative cache organization along the lines of the speculative versioning cache for thread-level speculation (TLS) purposes. Unlike in the case of TLS where the main requirement is to either commit or squash a speculative version of a cache, however, redundant threading or similar techniques for soft error protection further demands an efficient comparison (or checking) among the multiple cache versions for detecting and correcting soft errors during execution.

In addition, when a soft error occurs and the microprocessor needs to roll back to a previous checkpoint, i.e. the old cache status at a previous checkpoint needs to be recovered, known L1 cache memory structure is not capable of doing so because data in the L1 cache would have already been overwritten by the writes from the processor. What is needed, therefore, is an efficient system and method for detecting soft errors with correction or rollback capabilities.

BRIEF SUMMARY OF THE INVENTION

A write filter cache system and method for protecting a microprocessor core from soft errors are provided. In one aspect, the system may comprise a processor core that is operable to execute a main thread and a redundant thread. The system also includes a write filter cache that stores data associated with the main thread and data associated with the redundant thread. A comparator is operable to compare the data associated with the main thread and the data associated with the redundant thread. Cache memory structure stores data from the write filter cache only if the data associated with the main thread and the data associated with the redundant thread are the same.

In another aspect, the write filter cache may include one or more cachelets, for instance, each cachelet storing data for each respective thread or process. Yet in another aspect, the write filter cache is operable to be flushed after the data is moved or committed to the cache memory structure. The data associated with the main thread and the data associated with the redundant thread may be squashed from the write filter cache if the data associated with the main thread and the data associated with the redundant thread are not the same.

A write filter cache system in another aspect may comprise a plurality of processor cores that are operable to execute one or more threads and cache memory shared by the plurality of processor cores. A means operable to store data stores data associated with the plurality of processor cores before storing to the cache memory. A means operable to compare data compares data associated with the plurality of processor cores. The data associated with the plurality of processor cores is committed to the shared cache memory only if the data associated with the plurality of processor cores are uniform.

A method of protecting a microprocessor core from soft errors in one aspect may comprise receiving a cache write request and if a write filter cache is not full, storing write data associated with the cache write request into a write filter cache without storing into main cache memory. If the write filter cache is full, the method includes initiating a new microprocessor state checkpoint request.

In another aspect, the step of initiating a new microprocessor state check point request may include comparing data stored in the write filter cache for a plurality of threads of redundant threading, rolling back to current checkpoint if the data among the plurality of threads are not the same, committing the data to main cache memory if the data among the plurality of threads are the same, generating a new checkpoint as a current checkpoint if the data among the plurality of threads are the same, flushing the data from the write filter cache, and resuming execution from the current checkpoint.

Yet in another aspect, a method of protecting a microprocessor core from soft errors may comprise receiving a cache read request from a remote device, searching a write filter cache and a main cache memory for data associated with the cache read request, sending data associated with the cache read request to a requester if the data is found in the main cache memory but not in the write filter cache, forwarding a cache miss request if the data associated with the cache read request is not found in either the write filter cache or the main cache memory, and initiating a checkpoint request, if the data associated with the cache read request is found in the write filter cache.

Further features as well as the structure and operation of various embodiments are described in detail below with reference to the accompanying drawings. In the drawings, like reference numbers indicate identical or functionally similar elements.

DETAILED DESCRIPTION

An exemplary embodiment of the present disclosure provides a cache memory system, for example, an L1 cache memory system or the like, and organization that has a rollback capability and a method thereof. L1 cache memory system and organization in one embodiment enables a microprocessor to keep a copy of clean data efficiently and also enables the processor to quickly rollback to an earlier checkpoint. This approach is useful in moving checkpoints all the way up into the L1 cache memory system unlike known techniques that only checkpoint and compare within the processor pipelines, or up to the processor register array but not beyond. In one embodiment of the present disclosure, the structures in the L1 cache memory system are ECC and/or parity protected as appropriate because they store the checkpoint information.

Figure 1:
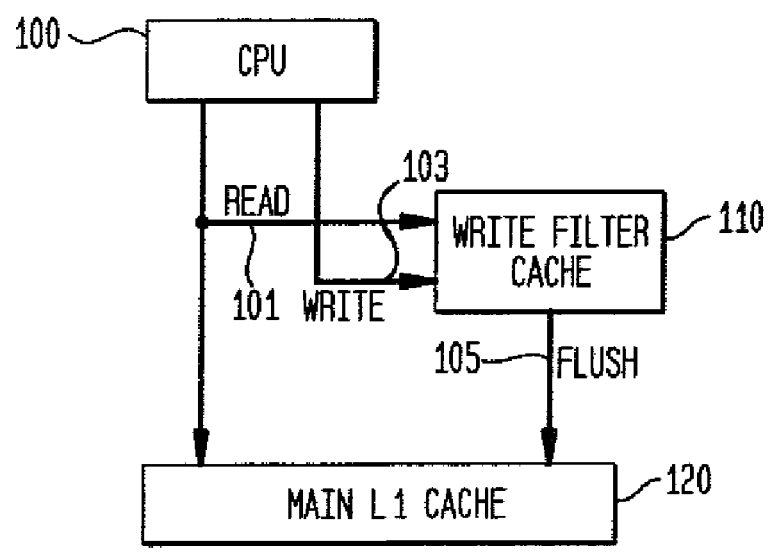
FIG. 1 illustrates L1 cache memory system incorporating a Write Filter Cache (WFC) as a single cache with different sets or ways in one embodiment of the present disclosure.
Figure 2:
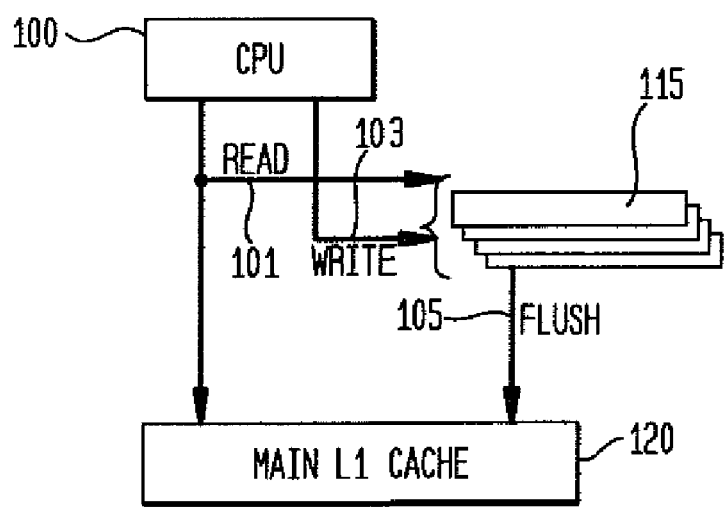
FIG. 2 illustrates a L1 cache memory system incorporating a Write Filter Cache (WFC) as multiple cachelets in one embodiment of the present disclosure.

A cache system in one embodiment of the present disclosure is organized as a multilateral organization as illustrated in FIG. 1. A write filter cache (WFC) structure 110 is placed in front of a primary L1 cache memory 120, that is, in between a processor core 100 and the L1 cache 120. The WFC may comprise a small cache memory and can be SRAM or any memory device that can be used as cache memory. The WFC may be a single cache with multiple ways or sets 110 as shown in FIG. 1. It also may be a collection of cachelets 115 as shown in FIG. 2, parameterized to fit the degree of redundant multithreading. In one embodiment, both the main L1 cache and the WFC tags combine to form the tag for the L1 cache memory system. In an exemplary embodiment of the present disclosure, the main L1 cache structure 120 is treated as a read only structure 101 during normal processor operation. All data coming from the microprocessor core 100 to be written in the L1 cache memory system is temporary buffered 103 in the WFC structure 110. In an exemplary embodiment, accepted checkpoints are moved into the L1 cache memory system 120 rather than keeping them within buffers or register arrays in the microprocessor core pipeline. In this way, when an executing program needs to roll back, the data in the WFC can be simply squashed since the main L1 cache memory structure has the data matching the last committed correct checkpoint status.

In one embodiment of the present disclosure, there is only a single directional way 105 to update the main L1 cache memory structure 120 with data from the WFC 110. For instance, whenever the WFC 110 is full or if there is a need to create a new checkpoint, the WFC is flushed and committed 105 into the main L1 cache structure 120 to update the L1 cache memory system status. In one embodiment, the flushing of the WFC may be performed as an atomic operation. In another embodiment, the lines in the WFC may be marked as clean and replace them on demand when new writes into the WFC occur.

FIG. 2 illustrates a L1 cache memory system incorporating a Write Filter Cache (WFC) as multiple cachelets in one embodiment of the present disclosure. The WFC of the present disclosure may include a plurality of cachelets 115. Using cachelets for different threads or processes may provide energy efficiency during processor execution. For instance, during the times that the particular cachelet is not being used by its corresponding thread or process, it may be powered down to save processing power.

Figure 3:
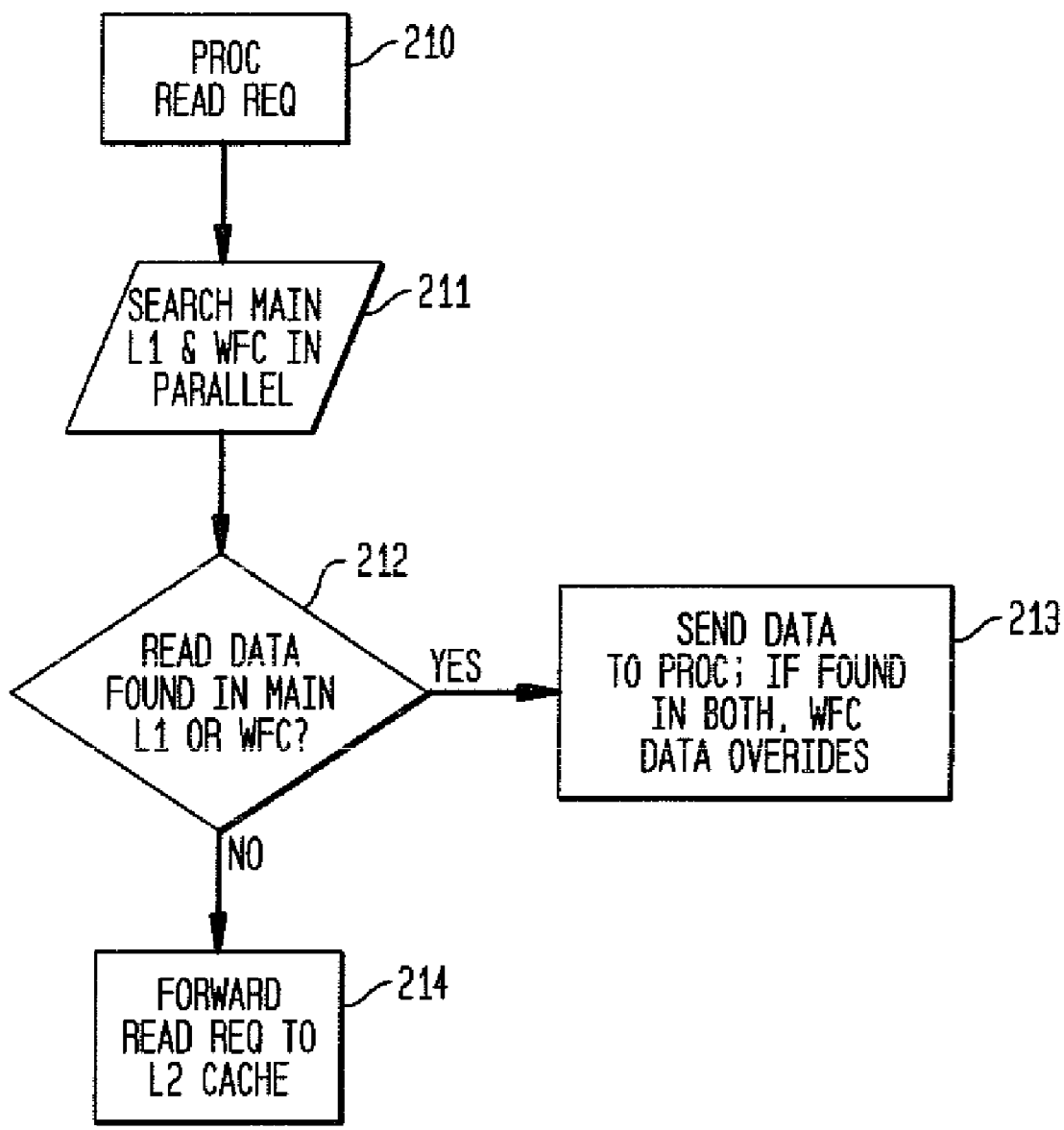
FIG. 3 is a flow diagram illustrating a method of handling a READ request in a new L1 cache memory system incorporating the Write Filter Cache (WFC) in one embodiment of the present disclosure.

The operation of a new L1 cache memory system of present disclosure with the rest of the computing system, for example, the CPU and the second level (L2) cache memory, will now be described in one embodiment. FIG. 3 is a flow diagram illustrating a method of handling a READ request in a new L1 cache memory system incorporating the Write Filter Cache (WFC) in one embodiment of the present disclosure. At 210, read requests 210 come into an L1 cache memory system from a processor. The processor in one embodiment will launch a parallel search at 211 through the tags of the main L1 cache structure and the WFC. If the data is found at 212 in either of the two sub-caches, the data is delivered to the processor at 213. However, if the data is found in both the WFC and the main L1 cache structure, the copy found in the WFC is delivered to the processor at 213 since the data in the WFC is always the most recent version of the L1 cache memory system data. If the data is not found in the L1 cache memory system, a miss request is forwarded downwards to the L2 cache memory at 214 and beyond, for instance, as is normally done when a cache miss occurs.

Figure 4:
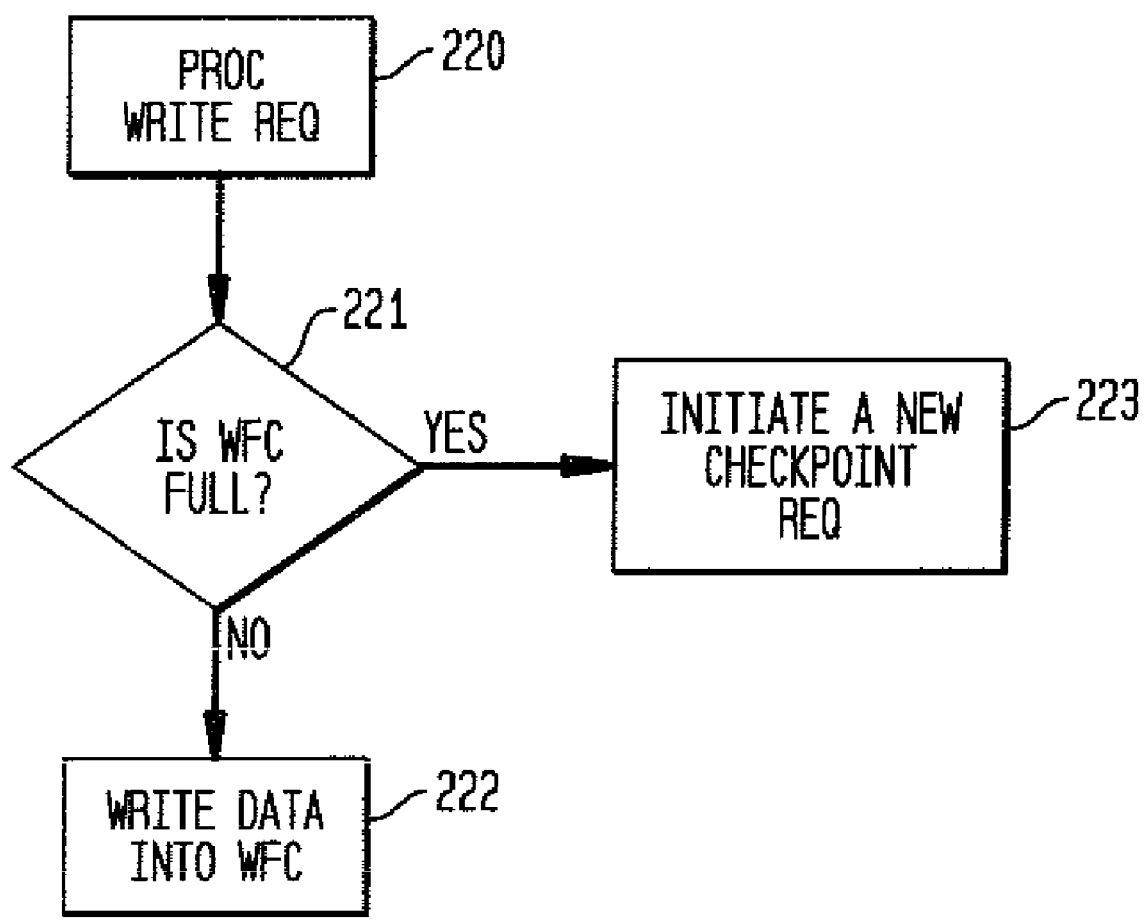
FIG. 4 is a flow diagram illustrating a method of handling a WRITE request in a new L1 cache memory system incorporating the Write Filter Cache (WFC) in one embodiment of the present disclosure.

FIG. 4 is a flow diagram illustrating a method of handling a WRITE request in a new L1 cache memory system incorporating the Write Filter Cache (WFC) in one embodiment of the present disclosure. At 220, a processor issues one or more write requests to the L1 cache memory system. In an exemplary embodiment of the present disclosure, writes from the processor are only directed to the WFC at 221. At 222, the WFC buffers dirty data so that the data in the main L1 cache structure is always clean and up-to-date to the current checkpoint. Briefly, dirty data refers to the data that was not previously error checked, for instance, through redundant threading. In one embodiment, there is no single line replacement for dirty lines for the WFC. Hence, whenever the WFC is full, or a given cache set or way is full in the WFC, or a line resident in the WFC needs to be shipped into the L2 cache for coherence purposes, a new checkpoint creation request is initiated at 223, to either commit all the WFC contents into the main L1 or to squash the contents, for instance, following the necessary error checking.

Figure 5:
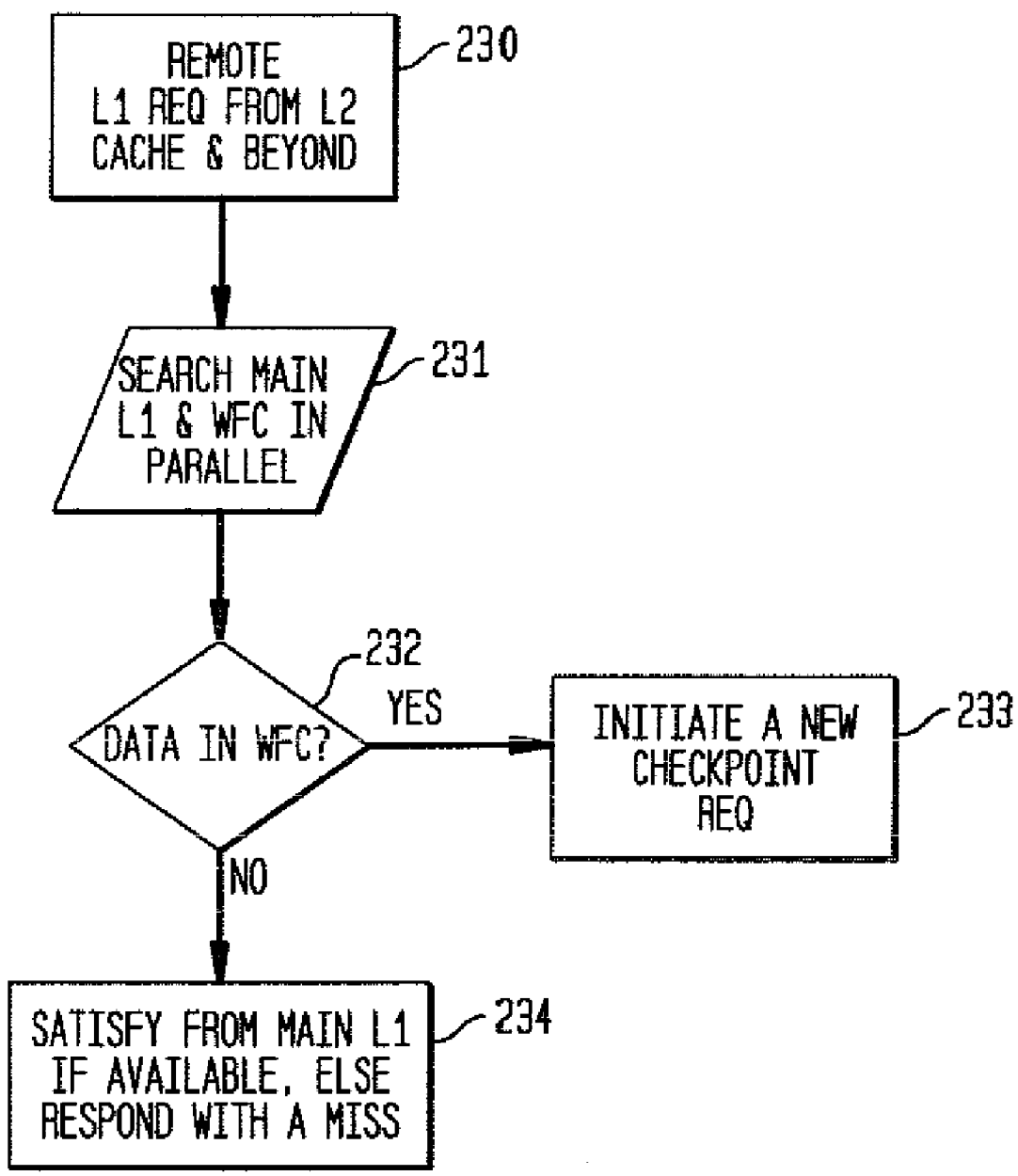
FIG. 5 is a flow diagram illustrating a method of handling a remote request in a new L1 cache memory system incorporating the Write Filter Cache (WFC) in one embodiment of the present disclosure.

Since a single microprocessor core is but a part of a chip or system of processors in today's typical system, there is a need to address operational issues dealing with remote coherent requests that may be delivered to an L1 cache memory system, possibly emanating from the larger system's shared L2 cache memory and/or beyond. FIG. 5 is a flow diagram illustrating a method of handling a remote request in a new L1 cache memory system incorporating the Write Filter Cache (WFC) in one embodiment of the present disclosure. At 230, one or more remote L1 cache memory system requests, for instance, from the L2 cache memory or beyond are received. On receiving such a request 230, which for example, may be a read, the L1 cache memory system launches a parallel search at 231 in the tags of the main L1 cache structure and the WFC. If the data is not found in the WFC, but found in the main L1 cache structure at 234, the data is returned to the L2 cache memory. If no data is found at 234 in either the WFC or the main L1 cache structure, a miss response is sent to the L2 cache memory. However, if the data is found in the WFC at 232, a new checkpoint request 233 is initiated. If the request is a read request, the data to the L2 cache memory and beyond is supplied after the WFC data is committed into the L1 cache memory system. In order to be able to commit the WFC data into the L1 cache memory system state, a checkpoint creation process is initiated to make sure that the data is not corrupted and all redundant threads agree. This remote access provision also means that the L1 cache memory system with the WFC structure will not be a bottleneck in a multiple processor system environment, meaning that a remote access request can speedily lead to the release of data held in the WFC structure.

Figure 6:
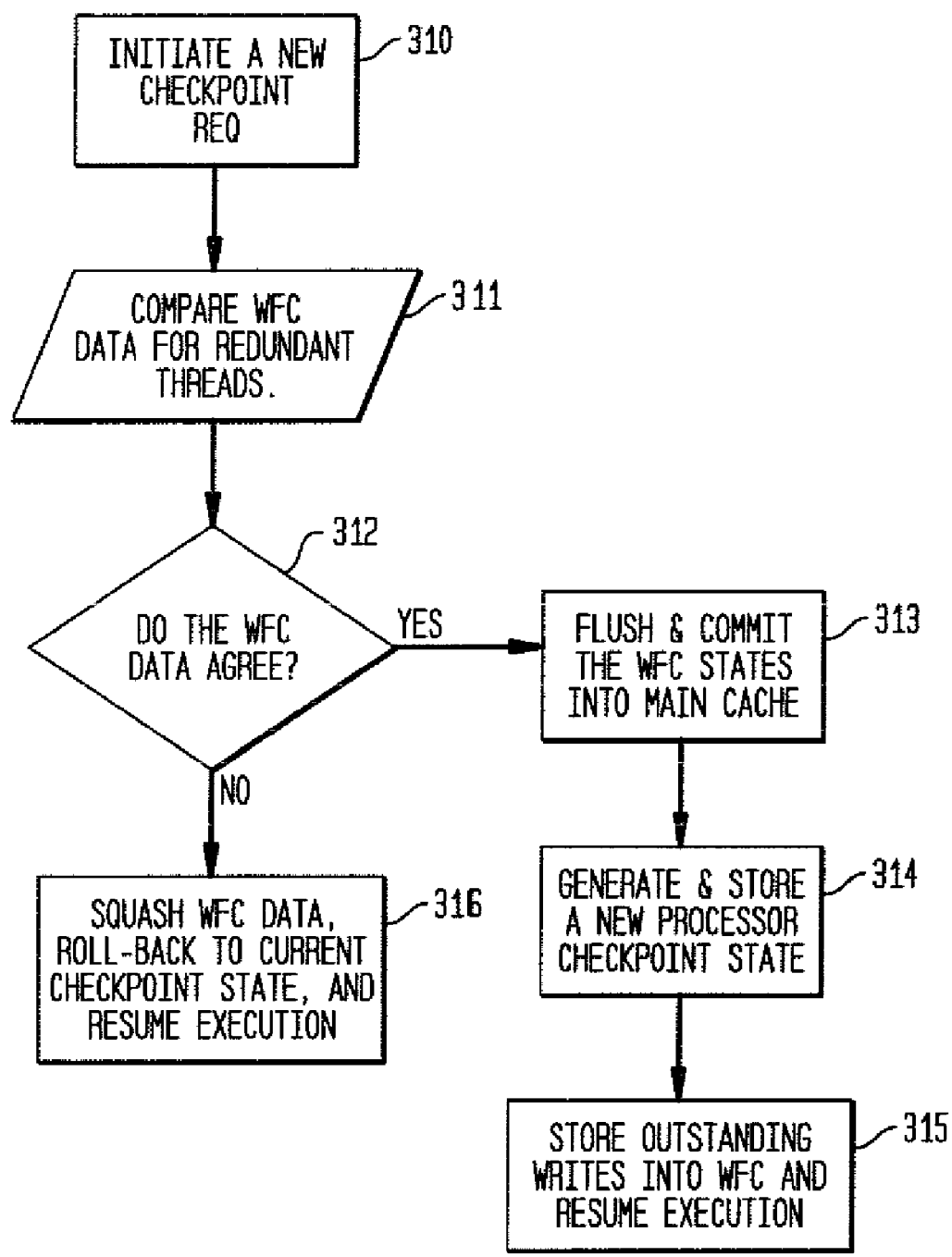
FIG. 6 is a flow diagram illustrating a method of initiating a checkpoint for updating a new L1 cache memory system with contents of a Write Filter Cache (WFC) in one embodiment of the present disclosure.

A microprocessor checkpoint refers to a state that a program can roll back to. Generally, a program cannot roll back to any earlier state before its current checkpoint state. A program can therefore roll back to its current saved checkpoint. Generally, a program cannot return past a saved checkpoint. Hence, if a given program can be verified up to a certain point using either redundant threading or some other means, then a new checkpoint can be taken at that certain point. FIG. 6 is a flow diagram illustrating a method of initiating a checkpoint for updating a new L1 cache memory system with contents of a Write Filter Cache (WFC) in one embodiment of the present disclosure. At 310, a request to initiate a new checkpoint is received. For instance, a new checkpoint is requested when the WFC is full, a given set or way in the WFC is full, or a remote read or exclusive grab request is made to a data element currently held in the WFC.

At 311, two or more WFC data for two or more threads of redundant threading are compared to check for errors. If the error checking comparison results in no errors, the contents of the WFC are flushed and committed into the main L1 cache structure at 313. This flush and commit approach updates the L1 cache memory system in one shot. In another embodiment, rather than performing one atomic operation for committing the data, the lines in the WFC may be marked clean without immediately uploading them into the main L1 cache structure. In that case, the lines marked clean in the WFC may be promoted gradually into the main L1 cache structure as the program threads write data into the WFC. New lines written into the WFC are all marked dirty, and a dirty line are not replaced or promoted into the main L1 data cache structure.

After the WFC data is committed into the main L1 cache structure, a microprocessor or the like may generate and store a new architectural state checkpoint at this point at 314, considering that all earlier data up till this point has been properly checked and verified to be error free. If there are outstanding writes coming into the WFC or remote requests, those are handled accordingly, and the system resumes execution at 315.

On the other hand, if the WFC data error checking comparison results in errors at 312, this implies that there has been some sort of an error since the current checkpoint was generated. The system then squashes all the data in the WFC, rolled-back to the current stored checkpoint state, and resumes execution at 316 from the current checkpoint state. Execution will continue until the need to check errors or to generate a new checkpoint arises.

In an exemplary embodiment, the L1 cache memory system of present disclosure may be used to protect the full microprocessor core up to and including the L1 cache memory from soft errors. In one embodiment, the L1 cache memory system, comprising at least a main L1 cache structure and a WFC are hardened with appropriate parity and/or ECC protection because they store the checkpoint state information. In an exemplary embodiment, the method and system of the present disclosure detects and corrects soft errors in a processor core up to and including the L1 cache memory system.

One embodiment of the present disclosure provides a coarser-grain low overhead redundant multithreading method with new cache to enable soft error detection and full program recovery. This approach causes very little overhead in terms of both chip area and system performance.

Even in the era of device miniaturization, as microprocessor frequency continues higher, DRAM memory speed is bound to lag far behind. As a result, cache misses especially misses to the Level two (L2) caches will continue to be expensive in processor cycles. Looking at future technology projections, it is anticipated that L2 cache misses will be far more expensive in terms of cycle times compared to as they are today. Currently, L2 cache misses can cost anywhere around 200 processor cycles or more depending on the microprocessor design and the depth of the processor pipelines. Along such trends, L2 cache miss penalty is expected to reach 500 cycles or more in the near future.

An important issue therefore is what the idle processor cycles must be used for during these long L2 cache miss penalty times. Potentially, the processor could be stalled and idle during the L2 miss period since there may not be much computation to hide such long miss latency times. A potential response to this has been the concept of multithreading, where the processor juggles between multiple threads to minimize unused processor cycle times. In multithreading computation, the processor switches to another thread, while the stalled thread waits for the requested data, to increase the utilization of the processor. However, since the two different threads have different working sets, the cache memories, predictor structures like the branch predictor, and prefetch predictor structures may need warming up to be able to provide the data needed by the new thread. Hence, generally the second thread may see some cache misses and/or mispredictions.

The method and system in one embodiment of the present disclosure utilizes the L2 cache miss latency cycles and other long processor events like processor store buffer full and I/O operation for soft error reliability purposes. See, M. K. Qureshi, O. Mutlu, and Y. N. Patt, "Microarchitecture-Based Introspection: A Technique for Transient-Fault Tolerance in Microprocessors", Proceedings of the International Conference on Dependable Systems and Networks, June 2004. In those cases, instead of waiting for the miss to be served or the corresponding operation to complete, the processor switches to a redundant (copy) thread of the main thread and re-performs the same computation to double-check the previous executed part of the main thread. In one embodiment, the error detection is performed by comparing the output from the two threads and the error recovery is done using checkpointing and rollback recovery.

The performance degradation of such redundant threading can be expected to be small. For example, for those redundant threads that are invoked only on an L2 cache miss, a store buffer full situation, or an I/O operation, the redundant thread only uses otherwise idle cycles. Because the main thread and its redundant thread are performing the same computation, the redundant thread benefits from warm up and prefetch effects in the cache and the predictor structures from the main thread run. The redundant thread should have very few cache misses and wrong branch predictions. Thus, the redundant thread is able to speed up quickly without delaying the main thread's execution too much.

Figure 7:
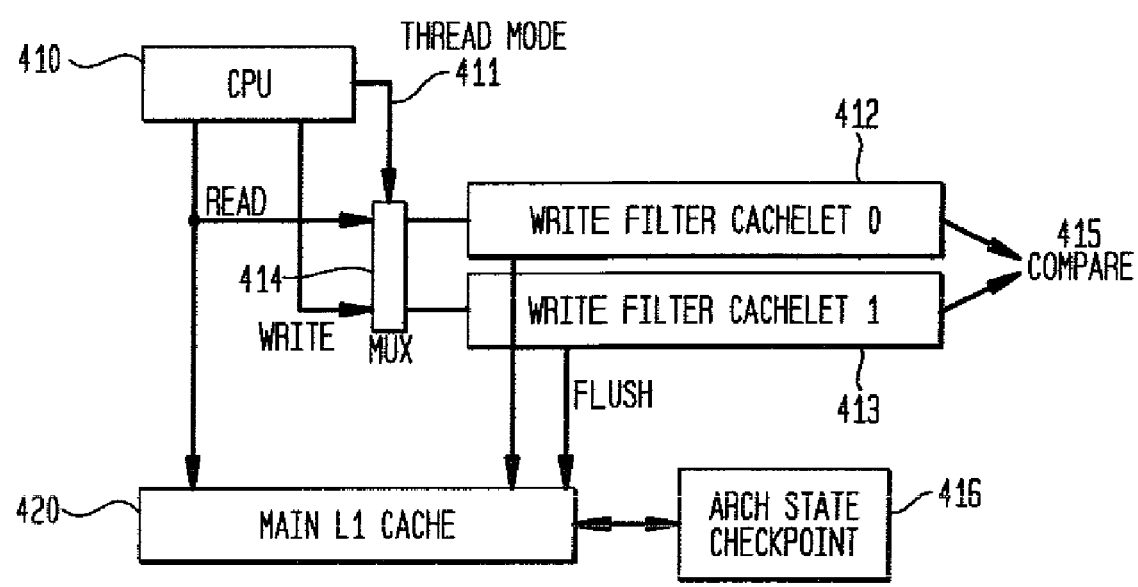
FIG. 7 illustrates a framework for using a new L1 cache memory system incorporating a Write Filter Cache (WFC) in a redundant threading environment for soft error protection of a microprocessor core in one embodiment of the present disclosure.

FIG. 7 illustrates a framework for using a new L1 cache memory system incorporating a Write Filter Cache (WFC) in a redundant threading environment for soft error protection of a microprocessor core in one embodiment of the present disclosure. A processor 410 has a main thread and a redundant thread in its pipeline. Both threads keep a working image in the processor space. Similarly, each thread has its own WFC space, which for instance may be ECC or parity protected. Main thread's WFC cachelet is marked by 412 and redundant thread's WFC cachelet is marked as 413. The WFC space for both threads may be a single cache divided among the threads by sets or different cachelets. In one embodiment, a thread mode flag 411 and a multiplexer 414 are used to control the selecting of appropriate cache in the WFC space for processing. Data compare logic 415 is used as needed to compare and check that a corresponding data object stored by the main thread and the redundant thread are the same. A main L1 cache structure 420 may be parity or ECC protected. The current Arch State Checkpoint 416, which may be ECC protected stores the error-checked and verified last correct state of the processor and execution.

Figure 8:
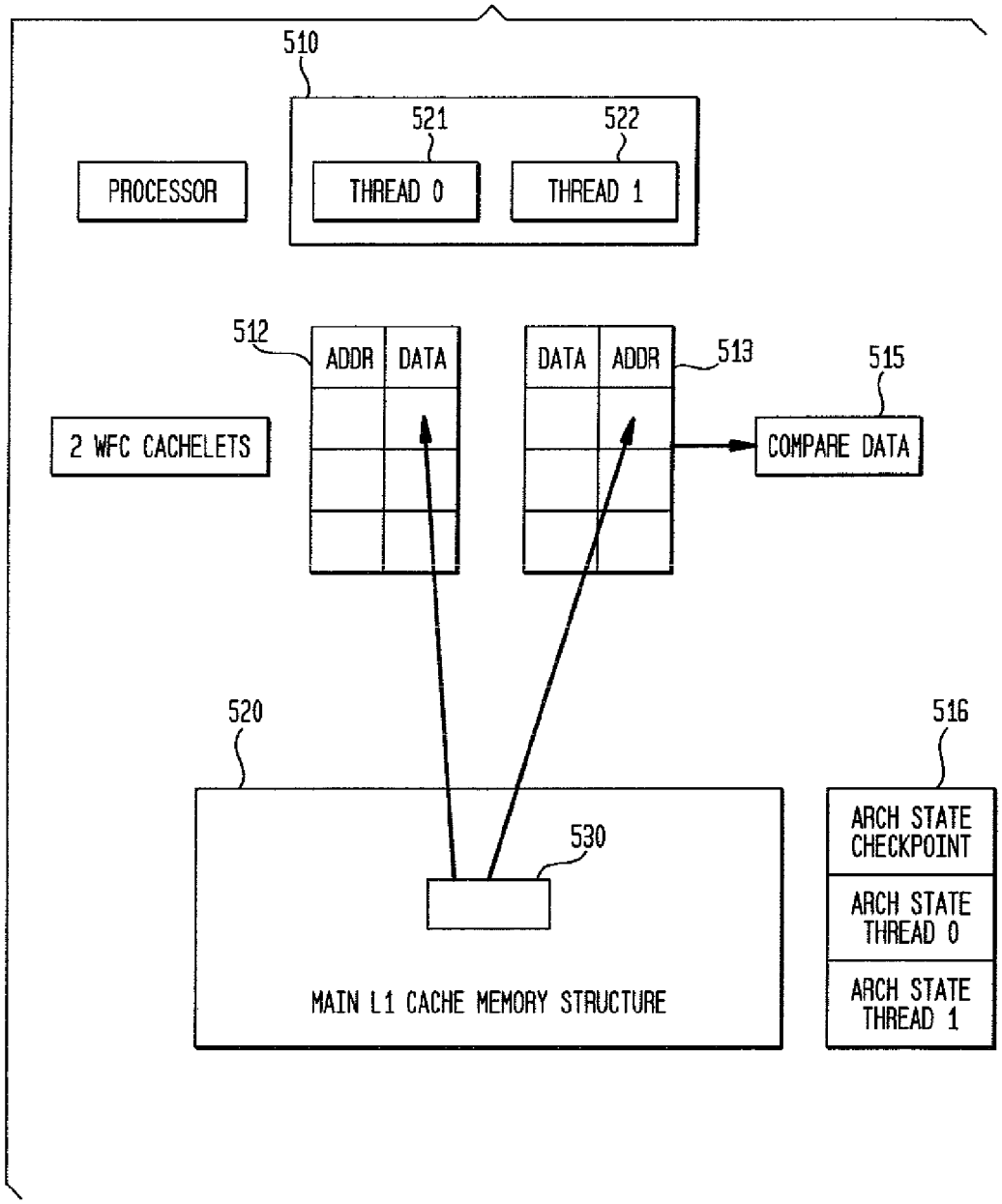
FIG. 8 illustrates a framework in another view for using a new L1 cache memory system incorporating a Write Filter Cache (WFC) in a redundant threading environment for soft error protection of a microprocessor core in one embodiment of the present disclosure.

FIG. 8 illustrates a framework in another view for using a new L1 cache memory system incorporating a Write Filter Cache (WFC) in a redundant threading environment for soft error protection of a microprocessor core in one embodiment of the present disclosure. As shown in the pipeline portion of a processor 510 in FIG. 5, Thread-0 521, which is the main thread, has a redundant copy Thread-1 522. Both threads keep a working image in the processor 510 space. Similarly, each thread has its own WFC space, which for instance may be ECC or parity protected. Thread-0's WFC cachelet is marked by 512 and Thread-1's WFC cachelet is marked as 513. The WFC space for both threads may be a single cache divided among the threads by sets or different cachelets, which may be controlled by a thread mode flag. In addition to the WFC cache space, a data compare logic 515 compares and checks that a corresponding data objects stored by Thread-0 and Thread-1 are the same. A main L1 cache structure 530 may be parity or ECC protected. The current Arch State Checkpoint 516, which may be ECC protected stores the error-checked and verified last correct state of the processor and execution.

In one embodiment, computation starts by the processor making a second image, Thread-1 522, of the main/leading thread, Thread-0 521. Thread-0 starts computation and is not allowed to write into the main L1 data cache structure. All writes are stored into its corresponding WFC space. When an L2 cache miss occurs, for example, the processor switches computation to Thread-1 and the goal is to reach the same point as Thread-0. Once the redundant thread, Thread-1, reaches the same point as Thread-0 before the L2 cache miss, the computation stops and the data states of Thread-0 and Thread-1 in the WFC are compared by a comparator 515 with each other. The comparator 515 may be any device, known or will-be-known, that can compare data. If they match, meaning that the previous computation is verified to be correct, the WFC is flushed and committed into the L1 cache memory system and a new Arch State Checkpoint 516 is created. Otherwise, which means that an error happened in an earlier computation, the processor squashes the WFC contents and rolls-back to the previous checkpoint to start the main thread, Thread-0, computation from that point. If the same error were to persist after multiple attempts, the processor will raise an unrecoverable error flag for the operating system to take the next steps.

Although the example above illustrated performing redundant threading when a cache miss occurs, it is not necessary that the redundant threading be performed during cache miss situations only. Rather, redundant thread may be scheduled at any other desired or convenient processing time or based on different policies. For example, redundant threading may be performed periodically, every predetermined period such as every 100 cycles, or based on any other desired policy. For instance, a main process thread and its redundant thread may be spurned and issued for processing, starting at the same time or within a few cycles of each other.

While illustration for the WFC cache memory system have been achieved in this description through redundant multithreading in a single microprocessor core, those skilled in the art will understand that there are various ways in which the WFC concept may be used in single core or multiple core systems to protect against soft errors. For example, WFC of the present disclosure can be used in a dual-core microprocessor system to check for errors and enable recovery in case of an error. Suppose that the two cores share a final cache level in the cache memory hierarchy, and this cache may be the second (L2) or the third (L3) cache. The WFC of the present disclosure in one embodiment may then be situated at the shared cache level for both cores. The two cores may be used to run the same workload in single thread mode each and their data compared and checked before finally allowing committing to memory. In such an arrangement, each core's corresponding WFC will buffer its store data, at a given point in the execution, the WFCs' data will be compared for uniformity and if they agree, will be allowed to commit to the next level of memory and a new checkpoint created. If the data do not agree, the WFCs will be flushed or squashed and the processor cores will rollback to the current checkpoint and begin processing. Similarly, as in the single microprocessor core multi-threaded illustration from above, if the WFC is full but there is no detected error, a new checkpoint can be created by flushing the data in the WFC to the shared cache.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A write filter cache system for protecting a microprocessor core from soft errors, comprising:
   a processor core operable to execute a main thread and a redundant thread;
   a write filter cache operable to store data associated with the main thread and data associated with the redundant thread;
   a comparator operable to compare the data associated with the main thread and the data associated with the redundant thread; and
   cache memory structure operable to store data from the write filter cache only if the data associated with the main thread and the data associated with the redundant thread are the same,
   wherein all data is transferred from the write filter cache to the cache memory structure at once.

2. A write filter cache system for protecting a microprocessor core from soft errors, comprising:
   a processor core operable to execute a main thread and a redundant thread;
   a write filter cache operable to store data associated with the main thread and data associated with the redundant thread;
   a comparator operable to compare the data associated with the main thread and the data associated with the redundant thread; and
   cache memory structure operable to store data from the write filter cache only if the data associated with the main thread and the data associated with the redundant thread are the same,
   wherein one or more lines of data in the write filter cache that are the same between the main thread and the redundant thread are marked, and the one or more marked lines are transferred on demand as new writes into the write filter cache occur.

3. The system of claim 2, wherein the write filter cache includes one or more cachelets.

4. The system of claim 2, wherein the write filter cache is operable to be flushed after the data is moved to the cache memory structure.

5. The system of claim 2, wherein the data associated with the main thread and the data associated with the redundant thread are squashed from the write filter cache if the data associated with the main thread and the data associated with the redundant thread are not the same.

6. A method of protecting a microprocessor core from soft errors, comprising:
   receiving a cache write request;
   if a write filter cache is not full storing write data associated with the cache write request into a write filter cache without storing into main cache memo; and
   if the write filter cache is full initiating a new microprocessor state checkpoint request, wherein the step of initiating a new microprocessor state check point request includes:
   comparing data stored in the write filter cache for a plurality of threads of redundant threading;
   rolling back to current checkpoint if the data among the plurality of threads are not the same;
   committing the data to main cache memory if the data among the plurality of threads are the same;
   generating a new checkpoint as a current checkpoint if the data among the plurality of threads are the same;
   flushing the data from the write filter cache; and
   resuming execution from the current checkpoint.

7. The method of claim 6, wherein the step of committing includes:
   transferring the data to the main cache memory all at once.

8. The method of claim 6, wherein the step of committing includes:
   marking the data in the write filter cache; and
   transferring the marked data to the main cache memory on demand.

9. The method of claim 8, wherein the step of transferring including:
   transferring the marked data to the main cache memory on demand when new data is written to the write filter cache.

10. A method of protecting a microprocessor core from soft errors, comprising:
    receiving a cache request;
    if a write filter cache is not full storing write data associated with the cache write request into a write filter cache without storing into main cache memory;
    if the write filter cache is full, microprocessor state checkpoint request
    receiving a cache read request;
    searching the write filter cache and the main cache memory;
    sending data associated with the cache read request to a requestor if the data is found in one of the write filter cache and the main cache memory;
    sending data found in the write filter cache if the data is found in both the write filter cache and the main cache memory; and
    forwarding a cache miss request if the data associated with the cache read request is not found in either the write filter cache or the main cache memory.

11. The method of claim 10, wherein the step of searching includes: searching the write filter cache and the main cache memory in parallel.

12. A method of protecting a microprocessor core from soft errors, comprising:
    receiving a cache read request from a remote device;
    searching a write filter cache and a main cache memory for data associated with the cache read request;
    sending data associated with the cache read request to a requestor if the data is found in the main cache memory but not in the write filter cache;
    forwarding a cache miss request if the data associated with the cache read request is not found in either the write filter cache or the main cache memory; and
    initiating a checkpoint request, if the data associated with the cache read request is found in the write filter cache.

13. The method of claim 12, wherein the step of receiving a cache read request from a remote device includes:
    receiving a cache read request from L2 memory system.

14. The method of claim 12, wherein the step of receiving a cache read request from a remote device includes:
    receiving a remote coherent request.

15. The method of claim 12, wherein the step of initiating a checkpoint request includes:
    comparing data stored in the write filter cache for a plurality of threads of redundant threading;
    rolling back to current checkpoint if the data among the plurality of threads are not the same;
    committing the data to main cache memory if the data among the plurality of threads are the same;
    generating a new checkpoint as a current checkpoint if the data among the plurality of threads are the same;
    flushing the data from the write filter cache; and
    resuming execution from the current checkpoint.

16. The method of claim 15, wherein the step of committing includes:
    transferring the data to the main cache memory all at once.

17. The method of claim 15, wherein the step of committing includes:
    marking the data in the write filter cache; and
    transferring the marked data to the main cache memory on demand.

* * * * *